Sept. 1, 1931. P. L. SPENCER 1,821,242
GASEOUS CONDUCTION APPARATUS
Filed Aug. 18, 1928
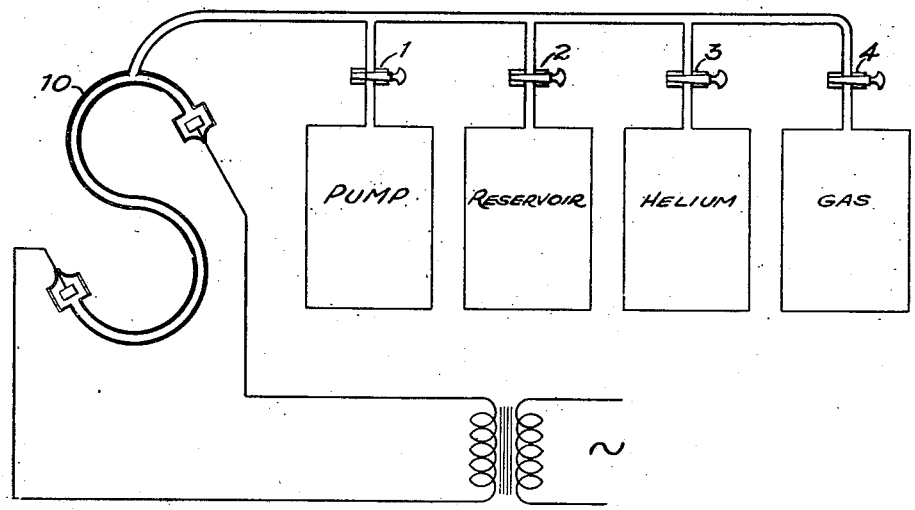
INVENTOR
PERCY L. SPENCER
BY
ATTORNEY Patented Sept. 1, 1931

1,821,242

UNITED STATES PATENT OFFICE

PERCY L. SPENCER, OF MEDFORD, MASSACHUSETTS, ASSIGNOR, BY MESNE ASSIGN-MENTS, TO OLD COLONY TRUST COMPANY, TRUSTEE, A CORPORATION OF MASSACHUSETTS

GASEOUS CONDUCTION APPARATUS

Application filed August 18, 1928. Serial No. 300,573.

My invention relates to gaseous conduction apparatus and methods of manufacture. More especially my invention relates to such devices for illuminating purposes.

Tubes containing spaced electrodes operating in a highly attenuated atmosphere have been used for some time for purposes of illumination. The nature of electrode material, pressure, kind and purity of gas used, are factors very intimately connected with the proper and satisfactory operation of such a tube. As a rule, such tubes should preferably have a long life and should give a light, the color of which remains substantially the same during the life of the tube. It has been found that certain impurities have objectionable effects on both of these characteristics of the tube.

Heretofore in the manufacture of such tubes, it has been customary to exhaust the tube of air to as high a degree as possible, then admit the desired gas to the desired pressure and seal the tube. Thereafter the tube was given a so-called aging, during which a heavy discharge was passed through the tube for a period extending to more than twenty hours of continuous operation. During this period of operation the impurities in the tube were cleaned up by being driven into the electrodes. When this occurred, the light emitted by the tube became substantially that due to the desired gas and the tube was ready for use. However, even in such case, after the tube was put into operation for illuminating purposes, the impurities gradually came back into the gas filling from the electrodes, rendering the tube worthless.

Another process necessitates the use of hard glass for the container. In this process, the glass tube is subjected to considerable heat whereby the gaseous impurities absorbed on the surface and in the pores of the glass are driven out and suitably fixed by getters or other chemicals. This latter process, however, as stated above, necessitates the use of hard glass for the vessels. In the manufacture of such tubes for advertising purpose, considerable lengths are often used. The difference in cost between this glass and the ordinary lead glass is such as to make this process result in an article which is expensive.

It is an object of my invention to provide a process for the manufacture of gaseous conduction tubes for illuminating purposes and in fact, for any purposes whatsoever whereby any ordinary glass may be used as the containing vessel. A further object is to devise a process which can be easily carried out, does not necessitate the use of harmful chemical agents and which results in an article which will retain its characteristics indefinitely while costing no more than any other like tube.

According to the present method, the glass container or tube is so treated during the exhausting operation and before the introduction of the desired gas that after sealing no appreciable amount of impurities are evolved from the glass, whether it be soft or hard and thus the tube is immediately ready for use. This result is accomplished by the aid of means which expeditiously and thoroughly combines with and remove all such impurities from the glass. This means may be a gas such as carbon monoxide or any mixture of gases which contain carbon monoxide such as illuminating gas. Any other gas containing an unsaturated compound which tends to take up oxygen and other like impurities in the glass may be used instead.

Referring to the drawing, the single figure shows a luminous discharge tube in process of being exhausted.

Tube 10 with its electrodes sealed in place is connected to an exhaust pump which exhausts the tube of its air content down to a pressure where a discharge may be initiated through the gas at a potential of about 10,000 volts. This pressure of the air is in the neighborhood of a few millimeters of mercury. A heavy current is forced through the tube at this time by means of the transformer, causing the entire tube to become strongly heated. Care must be taken that the glass is not heated to the point of collapse.

The heating of the tube is due not only to the intensity of the discharge but also to the gas content. As is well known, some gases in a tube will result in a discharge which keeps the tube comparatively cool while others will result in a discharge which heats up the tube.

When the tube has been heated up sufficiently, it is connected again to the exhaust pump by opening valve 1 which exhausts it of its air content to as high a vacuum as is possible to obtain. Before the tube has had time to cool substantially, a charge of carbon monoxide or illuminating gas containing a substantial quantity of same from a suitable reservoir is allowed to fill the tube. This is done by closing valve 1 and opening valve 2, valves 3 and 4 being closed. The gas content of this tube is thereupon exhausted to a pressure of some few millimeters so that a discharge may be initiated through the tube at a potential of about 10,000 volts. If desired, this discharge may be allowed to heat the tube and this step of the process repeated again by allowing more carbon monoxide or illuminating gas to enter and exhaust again.

However, in practice it has been found that one such step is sufficient. The carbon monoxide or illuminating gas, whichever one used, appears to penetrate into the pores of the glass and combine with the gaseous impurities adsorbed by the glass. The tube is now exhausted again by the pump and freed of all gases to as high a vacuum as possible. In this state, if desired, the occluded gases in the electrodes may be removed by bombardment, although this may be done at any stage of the process.

In its exhausted condition, and with valves 1 and 2 closed, the tube is then connected to a container of helium by means of valve 3. Enough helium is allowed to enter the tube so that the pressure within is about 1 cm. A discharge is initiated through the tube. The color of this discharge is mainly the characteristic golden glow of helium. However, some slight impurities might be present which visually contaminate the illumination of the tube. In such case the tube is exhausted by closing valve 3 and opening valve 1, and freed of its gas content. A second charge of helium is then allowed to enter the tube. A discharge is again initiated and by its appearance, gives a visual indication of the presence or absence of impurities in the tube. As a rule, two charges of helium are amply sufficient to remove whatever free impurities might be present. The tube is then connected to a tank containing the desired gas which is to be introduced. This gas may be of any kind which is sufficiently pure for use in such tubes. Thus any one or mixtures of the gases of the noble group, such as neon, helium, argon, for example, may be used. Mercury alone or with any one or a mixture of the rare gases may also be used if found desirable.

After filling, the tube is sealed off and is ready for immediate use. Such a tube when energized to luminescence by a suitable source of potential and current, will give a glow characteristic of the gas within it. As is well known, the presence of the slightest amount of impurities in a tube of this character results in a visual indication of a spectrum of the emitted glow. Tubes treated in this manner have been found to give a substantially pure spectrum of the gas or vapor within the tube without the necessity of aging.

The heating of the tube by the discharge through the air at a low pressure also anneals the glass. In the case of long lengths of tubing, customarily employed for advertising signs and the like, numerous bends and turns of glass tubing result in local strains. This annealing of the entire glass vessel has the beneficial result of softening the glass to such an extent that all internal strains therein are relieved, thereby making a more permanent and less easily breakable vessel.

This process is not dependent upon character, shape, or extent of the vessel used and may be used just as well on short tubes, of the same shape as incandescent lamps, or long lengths of tubing, such as used in neon signs. The glass may be either of hard or soft variety, as other factors may require. The process is simple, very easily carried out, and inexpensive. The results obtained are beneficial in the highest degree inasmuch as the tube is assured of a long life during which no purifying or aging discharges need be passed. By flushing out the tube with helium either in one or more stages, some free remaining impurities are removed.

I claim:

1. The method of freeing a soft glass vessel from occluded and adsorbed impurities, which consists of heating said glass vessel and exposing the hot surface thereof to the action of carbon monoxide.

2. The method of making a luminous electrical discharge tube of soft glass, which consists in removing impurities therefrom, which might impair the operation of the tube, by heating the tube to a temperature below that of softening and at the same time, exposing the surface of said tube to the action of carbon monoxide gas.

3. In the manufacture of a luminous discharge tube of soft glass containing a gas at a reduced pressure, the method of removing undesirable impurities from said glass which consists of passing a discharge through said tube to heat it, exposing said tube to the action of carbon monoxide gas and thereafter removing said gas.

4. The method of manufacturing a luminous discharge tube of soft glass which consists in causing a discharge to pass through the tube to heat it, exposing said tube to the action of carbon monoxide gas, removing said gas, flushing out the tube with helium and then filling said tube with the desired gas.

5. The method of manufacturing a gaseous conduction device which consists in exhausting the device of its normal air content to a pressure of about 1 cm. mercury, passing a discharge through to heat the glass tube, thereafter exhausting the tube of all remaining air, filling said tube with a gaseous substance containing carbon monoxide, exhausting said gaseous substance to a pressure of about 1 cm. mercury, passing a discharge therethrough, then exhausting said tube of the remaining gaseous substance and then filling said tube with a charge of desired gas.

6. In the manufacture of a gaseous conduction device having a glass container, the steps which consist of heating the glass container, exposing its inner surface to the action of a gaseous substance containing carbon monoxide, exhausting it to a pressure low enough to initiate a discharge therethrough at a potential of about 10,000 volts, repeating said step of exposing the inner surface of said glass tube to said gaseous substance and exhausting to a sufficiently low pressure to support a discharge therethrough and thereafter removing said gaseous substance and filling with the desired gas.

In testimony whereof, I have signed my name to this specification this 14th day of August, 1928.

PERCY L. SPENCER.